Feb. 22, 1949.  W. H. GILLE  2,462,630
PHASE-SENSITIVE SELF-BALANCING FREQUENCY METER
Filed Feb. 28, 1945
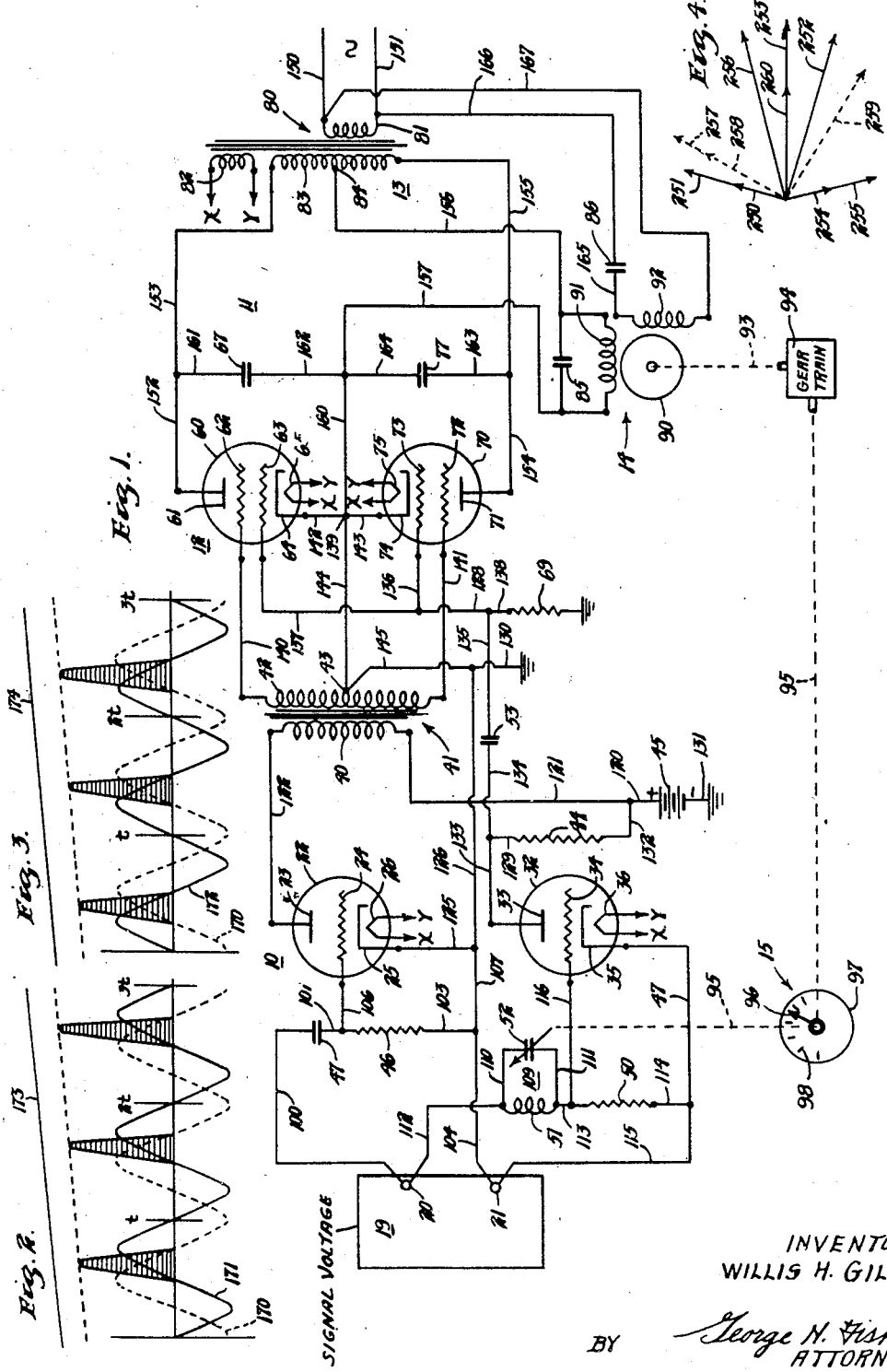
INVENTOR
WILLIS H. GILLE
BY George N. Fisher
ATTORNEY Patented Feb. 22, 1949

2,462,630

UNITED STATES PATENT OFFICE 2,462,630

PHASE-SENSITIVE SELF-BALANCING FREQUENCY METER

Willis H. Gille, St. Paul, Minn., assignor to Minneapolis-Honeywell Regulator Company, Minneapolis, Minn., a corporation of Delaware Application February 28, 1945, Serial No. 580,226

13 Claims. (Cl. 172—245)

1

This invention relates to the field of measuring instruments, and more particularly to instruments designed for measuring the frequency of radio frequency and audio frequency signals.

Frequency indicators of various types are already known, but suffer in general from lack in sensitivity and stability. I have been impressed by the stability of normally balanced networks, and by the sensitivity of electronic devices to slight changes in the phase relationship between properly applied voltages. An object of my invention is accordingly to provide a frequency indicator having features of stability contributed by a normally balanced network and features of sensitivity contributed by phase responsive electronic circuits.

It is another object of my invention to provide a frequency meter including an adjustable antiresonant circuit together with means, actuated by derivatives of a signal voltage of any frequency within the range of the instrument, for adjusting the circuit to be antiresonant at the frequency of the signal.

It is another object of my invention to provide a balanceable frequency indicating instrument in which derivatives of a signal voltage are compared, the phase relation between the derivatives being determined by the difference between the actual frequency and the frequency for which the instrument is balanced.

It is yet another object of my invention to provide an instrument as above described in which an indicator is actuated according to the phase relation between derivatives of the signal voltage.

It is a further object of my invention to provide a motor actuated frequency indicator mechanically connected to a component of a normally antiresonant network for adjusting the natural frequency of the network, combined with means obtaining from a signal voltage of variable frequency derivatives whose phase relation is determined by the relation of the frequency of the signal to the natural frequency of the network, and with means for actuating a motor so that the natural frequency of the network becomes that of the signal, the indication of the indicator being simultaneously corrected.

Various other objects, advantages and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanynig descriptive matter, in which I have illustrated and described a preferred embodiment of my invention. In the drawing:

Figure 1 illustrates schematically the construction of a frequency meter embodying my invention, and Figures 2, 3, and 4 are diagrams illustrative of the operation of my invention.

As shown in Figure 1, my invention includes circuit elements connected to comprise, as major components, a sensing circuit 10 and a motor control circuit 11, the latter including a phase discriminator 12 and a motor energizing circuit 13. The invention also includes a motor 14 and an indicator 15. Detailed consideration will now be given to the circuit elements making up these components and connecting them together to perform the desired function.

Construction

The instrument is shown to comprise a pair of input terminals 20 and 21 energized from a source 19 of electrical energy whose frequency is to be measured. Sensing circuit 10 is shown to comprise a pair of electron discharge devices in the form of indirectly heated triodes 22 and 32 having plates 23 and 33, grids 24 and 34, cathodes 25 and 35, and heater filaments 26 and 36. The plate circuit of triode 22 includes the primary coil 40 of a transformer 41 having a secondary winding 42 which is center tapped as at 43. The plate circuit of triode 32 includes a resistor 44, and a battery or other source of unidirectional voltage is provided at 45 for energizing the anode circuits of triodes 22 and 32.

The input circuit to triode 22 includes a fixed resistor 46 and a fixed capacitor 47. The input circuit to triode 32 includes a fixed resistor 50 and a normally antiresonant network 109 including a fixed inductor 51 and a variable capacitor 52. Transformer 41 is effective to couple triode 22 with motor control circuit 11, while the output of triode 32 is coupled to the motor control circuit through a capacitor 53.

Phase discriminator 12 includes a pair of electron discharge devices taking the form of tetrodes 60 and 70 which comprise respective plates 61 and 71, screen grids 62 and 72, control grids 63 and 73, cathodes 64 and 74, and heater filaments 65 and 75. A pair of capacitors 67 and 77 are connected in parallel with the output circuits of tetrodes 60 and 70, and an input resistor 69 is common to the control grids of both tetrodes.

Motor energizing circuit 13 is shown to comprise a transformer 80 having a primary winding 81 and a pair of secondary windings 82 and 83, the latter being center tapped as at 84. Transformer 81 is energized from any source of electrical energy of power frequency. Circuit 13 also includes a pair of capacitors 85 and 86.

Motor 14 is shown to include a rotor 90 and a pair of field windings 91 and 92 mechanically spaced around the rotor by an effective angle of 90 degrees. Rotor 90 is mounted on a shaft 93 and is effective through a gear reducer 94 to actuate a shaft 95 to which is connected the variable member of variable capacitor 52. An index 96 is also mounted on shaft 95 for movement with respect to an index plate 97 bearing a scale 98: index plate 97 is held fixed with respect to shaft 95 by any suitable means, not shown, and cooperates with index 96 to comprise indicator 15.

Circuit connections

A first input circuit from source 19 can be traced as follows: terminal 20, conductor 100, capacitor 47, conductor 101, resistor 46, conductors 103 and 104, and terminal 21. The voltage drop across resistor 46 is impressed between grid 24 and cathode 25 of triode 22 by conductor 106 and conductors 107 and 125, respectively.

Inductor 51 is connected in parallel with capacitor 52 by conductors 110 and 111 to comprise normally antiresonant network 109, whose natural frequency may be varied by adjustment of capacitor 52. A second input circuit can be traced as follows: terminal 20, conductor 112, network 109, conductor 113, resistor 50, conductors 114 and 115 and terminal 21. The voltage drop across resistor 50 is impressed between grid 34 and cathode 35 of triode 32 by conductors 116 and 117, respectively.

The anode circuit of triode 22 may be traced as follows: the positive pole of battery 45, conductors 120 and 121, primary winding 40 of transformer 41, conductor 122, plate 23 of triode 22, cathode 25 of the triode, conductors 125 and 126, ground connections 130 and 131 and the negative pole of battery 45.

The anode circuit of triode 32 may be traced as follows: the positive pole of battery 45, conductors 120 and 132, resistor 44, conductors 129 and 133, plate 33 of triode 32, cathode 35 of the triode, conductors 117, 115, 104, 107, and 126, ground connections 130 and 131 and the negative pole of battery 45.

Cathodes 64 and 74 of tetrodes 60 and 70 are joined at junction point 139 by conductors 142 and 143, and are grounded by a circuit which may be traced as follows: junction point 139, conductor 144, center tap 43 of secondary winding 42 of transformer 41, conductor 145, and ground connection 130. The alternating voltage drop across output resistor 44 of triode 32 is impressed upon input resistor 69 by lines which may be traced through conductor 134, coupling capacitor 53, and conductors 135 and 138 and through conductors 132 and 120, battery 45, and ground connections 131 and 130. The voltage drop across resistor 69 is impressed between control grids 63 and 73 and cathodes 64 and 74 of tetrodes 60 and 70, all respectively, through the cathode grounding circuit just traced and conductors 128, 136, and 137.

Heater filaments 26, 36, 65, and 75 of the various electron discharge devices are energized from secondary winding 82 of transformer 80 as indicated by X, Y. The complete filament circuit is conventional and therefore has not been shown in the drawing to avoid unnecessary complication. Capacitor 67 is connected between plate 61 and cathode 64 of tetrode 60 by conductors 152 and 161 and conductors 162 and 160, and capacitor 77 is connected between plate 71 and cathode 74 of tetrode 70 by conductors 154 and 163 and 164 and conductors 170.

Primary winding 81 is energized from any suitable source of alternating current of power frequency by means of conductors 150 and 151. Plates 61 and 71 of tetrodes 60 and 70 are connected to the terminals of secondary winding 73 by conductors 152 and 153, and conductors 154 and 155, respectively. Capacitor 85 is connected in parallel with winding 91 of motor 14, and the parallel circuit is connected between center tap 84 of secondary winding 83 by conductor 156 and with the cathodes of tetrodes 60 and 70 by conductors 157 and 160. Capacitor 86 is connected in series with winding 92 of motor 14 by conductor 165, and the series circuit is energized from the source of alternating current of power frequency by conductors 166 and 167.

Operation

The operation of my invention will now be described. When the signal voltage whose frequency is to be measured is impressed on input terminals 20 and 21, current flows through the series circuit comprising capacitor 47 and resistor 46: this current is indicated by vector 251 in Figure 4. The voltage drop across resistor 46 is in phase with this current, and is indicated by vector 250. The voltage drop across capacitor 47, however, lags the current in the circuit by substantially 90°, and is represented by vector 252. The voltage drops across the capacitor and the resistor are such that their vector sum, which is indicated by vector 253, is the voltage at terminals 20 and 21. The voltage on grid 24, represented by vector 250, thus leads the voltage at terminals 20 and 21 by substantially 90°.

When the signal voltage is impressed on input terminals 20 and 21, current also flows in a second series circuit including network 109 and resistor 50. For any particular setting of variable capacitor 52, network 109 may be predominantly inductive, predominantly capacitive, or purely resistive. First let it be assumed that network 109 is predominantly inductive. Under these conditions, while the voltage drop across resistor 50 is in phase with the current flowing in the circuit, the voltage drop across the network leads the current by substantially 90°. These voltage drops, also, are such that their vector sum, which has already been identified by vector 253, is the voltage at terminals 20 and 21: vectors 255, 254 and 256 represent respectively the current in the second circuit, the voltage drop in resistor 50, and the voltage drop in network 109.

It will be seen by reference to Figure 4 that there is an angle of substantially 180° between vectors 250 and 254, whose relationship is determined by the fact that the voltage represented by vector 253 is common to both circuits. Accordingly, voltages are impressed on the inputs of triodes 22 and 32 which are substantially 180° out of phase. The exact phase angle between these voltages is determined by the relationship between the magnitudes of the several reactive and resistive impedances.

Now let it be assumed that network 109 is predominantly capacitive. Under these conditions, while the voltage drop across resistor 50 is in phase with the current flowing in this circuit, the voltage drop across network 109 lags the current by 90°. The vector sum of the voltage drops is again equal in magnitude to the applied voltage, and has been identified by vector 253: vectors 257, 258, and 259 represent respectively the current in the second circuit, the voltage drop in resistor 50, and the voltage drop in network 109. It will be seen by reference to Figure 4 that the angle between vectors 250 and 258 is in the neighborhood of zero degrees. Accordingly, voltages are impressed on the inputs of triodes 22 and 32 which are substantially in phase. The exact phase angle between these voltages is determined by the relationship between the magnitudes of the several reactive and resistive impedances.

Finally, let it be assumed that network 109 is antiresonant at the frequency impressed on terminals 20 and 21. The impedance presented by network 109 is therefore purely resistive and the voltage drops across both network 109 and resistor 50 are in phase with the applied voltage: the voltage drop across resistor 50 is indicated by vector 260 which is shown to lie along vector 253. Accordingly, under these conditions, a phase angle of approximately 90° occurs between the voltage drop across resistor 46, indicated by vector 251, and the voltage drop across resistor 50, indicated by vector 260. The degree to which this angle departs from 90° is determined by the relationship between the resistive impedance and the reactance of capacitor 47.

The output current of triode 22 varies with change in the voltage impressed on the grid of the triode, but is of the opposite phase. This current, flowing through the primary winding of transformer 41, induces in the secondary of the transformer a voltage in quadrature with the current, whose magnitude varies with variation in that of the current. The connections between transformer winding 42 and tetrodes 60 and 70 are such that this voltage is equally divided and impressed in opposite phases between screen grids 62 and 72 and cathodes 64 and 74, respectively, of the tetrodes, so that the voltage on grid 62 lags the voltage on grid 24 by substantially 90° and therefore is substantially in phase with the voltage to be measured, while the voltage on grid 72 is substantially 180° out of phase with the signal voltage.

A control voltage varying in 180° phase relationship with the signal voltage impressed on grid 34 of triode 32 is impressed on the control grid 63 and 73 of tetrode 60 and 70 through capacitor 53, but this voltage is of the same phase on both grids. When the resonant circuit is predominantly capacitive, this control grid voltage leads the signal voltage by substantially 90°, when the circuit is inductive the control grid voltage lags the signal voltage by substantially 90°, and when the circuit is in resonance the control grid voltage is in phase with the signal voltage.

Figures 2 and 3 are representative of voltage relationships in tetrodes 60 and 70, respectively. In these figures, time is measured along the horizontal axes from the same instant in the cycle of control grid voltage and in the same units, $t$ being the period of one alternation of the signal being measured. Curve 170 is representative of the voltage applied to the control grids of both tubes, curve 171 (Figure 2) is representative of the voltage applied to screen grid 62 of tetrode 60, and curve 172 (Figure 3) is representative of the voltage applied to screen grid 72 of tetrode 70. In these figures the voltages on the respective grids are shown to be in quadrature, corresponding to a purely resistive impedance of network 109. At any time when the plate of one of the tetrodes is positive, current flows in the tube if both the screen grid and the control grid are also positive, and the maximum value of the current flowing is determined by the positive potential of the plate.

In Figure 2, the plate potential of tetrode 60 is indicated by the curve 173 and is shown to be positive. Current will flow in this tube during the interval between $t/2$ and $3t/4$, again during the intervals between $3t/2$ and $7t/4$, between $5t/2$ and $11t/4$, and so forth. In Figure 3 the plate potential of tetrode 70 is indicated by the curve 174 and is shown to be positive. Current will flow in this tube during the interval between $t/4$ and $t/2$, again during the intervals $5t/4$ and $3t/2$, between $9t/4$ and $5t/2$, and so forth.

Plates 61 and 71 of tetrodes 60 and 70 are energized in opposite phase relation with alternating current of relatively low frequency from secondary winding 83 and the plate circuits of each of these tubes includes winding 91 of motor 14. Thus, when tetrode 60 is discharging, plate current flows through winding 91 from left to right, and when tetrode 70 is discharging, plate current also flows through winding 91 from left to right.

The plate current in tetrode 60 for the half cycle of plate voltage during which the tetrode discharges has an average value which is related to the summation of the shaded pulses shown in Figure 2. Similarly, the plate current in tetrode 70 for the half cycle of plate voltage during which the tetrode discharges has an average value which is related to the summation of the shaded pulses shown in Figure 3. However, although these currents flow through winding 91 in the same direction in the two half cycles, the current flowing through winding 92 reverses in direction with each half cycle of the source. Due to the presence of condenser 86 in series with winding 92, the current flowing in winding 92 lags the voltage of the source by roughly 90°. Therefore, according to principles well known to those skilled in the art, motor 90 receives impulses from tetrode 60 for operation in a first direction during first half cycles of the low frequency source and impulses from tetrode 70 for operation in the opposite direction during second half cycles of the low frequency source.

Since, as is evident from a consideration of Figures 2 and 3, the pulses energizing motor 14 for operation in opposite directions are of equal magnitude when the relation between the control grid and screen grid voltages is that shown, the net result is that the two voltages effectively oppose one another, and no operation of the motor takes place. This voltage relation, as has previously been pointed out, prevails when the voltage applied to terminals 20 and 21 is at the frequency to which network 109 is antiresonant.

If the frequency to be measured is greater than that to which circuit 109 is antiresonant, circuit 109 presents a predominantly capacitive impedance to the flow of current, and this results in the displacement of curves 170 to the right with respect to curves 171 and 172. This moves curve 171 representing the voltage applied to screen grid 62 more nearly into phase, and curve 172, representing the voltage applied to screen grid 72, further out of phase, with curve 170, representing the voltage applied to control grids 63 and 73. This means that for a positive condition of plate 61 triode 60 discharges during a major portion of each half cycle of the high frequency voltage while for a positive condition of plate 71 triode 70 discharges during a minor portion of each half cycle of the high frequency voltage. The balanced relationship between the successive impulses given to winding 91 of motor 14 no longer prevails, since the energy transmitted by triode 60 is in excess of that transmitted by triode 70. Operation of motor 14 accordingly takes place in a first direction, and this in turn causes rotation of shaft 95 to move pointer 96 with respect to scale 98 so that a greater indication of frequency is given. At the same time, rotation of shaft 95 adjusts capacitor 52 to decrease the amount of capacitance in network 109. This action continues until the network has been so altered that it is antiresonant at the frequency of the voltage impressed on terminals 20 and 21. When this takes place, the balanced relation of output currents of the tetrodes is again attained, and operation of the motor is interrupted: the indicator shows the frequency to which network 109 is antiresonant for this particular setting of capacitor 52, which is the frequency being impressed on the input terminals.

If the frequency to be measured is less than that to which circuit 109 is antiresonant, circuit 109 presents a predominantly inductive impedance to the flow of current, and this results in the displacement of curve 170 to the left with respect to curves 171 and 172. This moves curve 171, representing the voltage applied to screen grid 62 further out of phase, and curve 172 representing the voltage applied to screen grid 72 more nearly into phase, with curve 170 representing the voltage applied to control grids 63 and 73. This means that for a positive condition of plate 71 triode 70 discharges during a major portion of each half cycle of the high frequency voltage while for a positive condition of plate 61 triode 60 discharges during a minor portion of each half cycle of the high frequency voltage. The balanced relationship between the successive impulses given to winding 91 of motor 14 no longer prevails, since the energy transmitted by triode 70 is in excess of that transmitted by triode 60. Operation of motor 14 accordingly takes place in a second direction, and this in turn causes rotation of shaft 95 to move pointer 96 with respect to scale 98 so that a smaller indication of frequency is given. At the same time, rotation of shaft 95 adjusts capacitor 52 to increase the amount of capacitance in network 109. This action continues until the network has been altered so that it is antiresonant at the frequency of the voltage impressed on terminals 20 and 21. When this takes place, the balance relation of output currents of the tetrodes is again attained, and operation of the motor is interrupted: the indicator shows the frequency to which network 109 is antiresonant for this particular setting of capacitor 52, which is the frequency being impressed on the input terminals.

From the foregoing discussion it will be evident that I have devised a frequency measuring system in which the signal to be measured provides two derivatives having phase relations which are determined by the instantaneous value of a component of the circuit which is mechanically coupled to the indicator itself. Operation of a servo motor is initiated in accordance with the phase relationship between the derivatives of the signal voltage, and takes place in such a direction as to change the indication of the indicator and simultaneously adjusts that component of the circuit having to do with the phase relation between the derivatives until a condition of balance is reached in the circuit. In the practice of my invention I have taken advantage of the stability of balanced electrical networks while at the same time also making use of the sensitivity of electronic circuits to changes in phase relations between properly applied voltages.

Numerous objects and advantages of my invention have been set forth in the foregoing description together with details of the structure and function of the invention, and the novel features thereof are pointed out in the appended claims. The disclosure, however, is illustrative only, and I may make changes in detail, especially in matters of shape, size and arrangement of parts, within the principle of the invention, to the full extent indicated by the broad general meaning of the terms in which the appended claims are expressed.

I claim as my invention:

1. In a device of the class described, in combination: first and second circuits adapted to be traversed by signal currents alternating at a common variable frequency; said first circuit comprising a resistive impedance and a reactive impedance connected in series; said second circuit comprising a resistive impedance and a normally antiresonant network connected in series; electron discharge means having control means for regulating the discharge thereof; means impressing the voltage drop across said first resistive impedance, due to said signal current, upon said control means; a motor; and means controlling the operation of said motor in accordance with the phase relation between the voltage drops across said resistive impedances, said last named means including said discharge means.

2. In a device of the class described, in combination: first and second circuits adapted to be traversed by signal current alternating at a common variable frequency; said first circuit comprising a resistive impedance and a reactive impedance connected in series; said second circuit comprising a resistive impedance and a normally antiresonant network connected in series; electrons discharge means having a plurality of control members for regulating the discharge thereof; means impressing upon one of said control members a voltage determined by the voltage drop across said second resistive impedance; a motor; and means controlling the operation of said motor in accordance with the phase relation between the voltage drops across said resistive impedances, said last named means including said discharge means.

3. In a device of the class described, in combination: first and second circuits adapted to be traversed by signal currents alternating at a common variable frequency; said first circuit comprising a resistive impedance; said second circuit comprising a resistive impedance and a normally antiresonant network connected in series; electron discharge devices each having a plurality of control members for jointly regulating the discharge thereof; means impressing upon one of said members of each of said devices a voltage determined by the voltage drop across said second resistive impedance; a motor; and means controlling the operation of said motor in accordance with the phase relation between the voltage drops across said resistive impedances, said last named means including said discharge devices.

4. In a device of the class described, in combination: first and second circuits adapted to be traversed by signal currents alternating at a common variable frequency; said first circuit comprising a resistive impedance and a reactive impedance connected in series; said second circuit comprising a resistive impedance and a normally antiresonant network connected in series; electron discharge devices each having a plurality of control members for jointly regulating the discharge thereof; means impressing upon one of said members of each of said devices a voltage determined by the voltage drop across said second resistive impedance; means impressing upon a second of said members of each of said devices a voltage determined by the voltage drop across said first resistive impedance; said last named means including means for reversing the phase of one of said impressed voltages with respect to the other; a frequency indicator; and means actuating said indicator in accordance with the phase relation between voltages impressed upon said control members.

5. In a device of the class described, in combination: first and second circuits adapted to be traversed by signal currents alternating at a common variable frequency; said first circuit comprising a resistive impedance and a reactive impedance connected in series; said second circuit comprising a resistive impedance and a normally antiresonant network connected in series; electron discharge devices each having a plurality of control members for jointly regulating the discharge thereof; means impressing upon one of said members of each of said devices a voltage determined by the voltage drop across said second resistive impedance; means impressing upon a second of said members of each of said devices a voltage determined by the voltage drop across said first resistive impedance; said last named means including means for reversing the phase of one of said impressed voltages with respect to the other; a motor; and means controlling the operation of said motor in accordance with the phase relation between voltages impressed upon said control members.

6. In a device of the class described, in combination: first and second circuits adapted to be traversed by signal currents alternating at a common variable frequency; said first circuit comprising a resistive impedance and a reactive impedance connected in series; said second circuit comprising a resistive impedance and a nomally antiresonant network connected in series; a first electron discharge device having a control member for regulating the discharge thereof; means impressing the voltage drop across said first resistive impedance, due to said signal current, upon said control member; further electron discharge devices each having a plurality of control members for jointly regulating the discharge thereof; means impressing upon one of said members of each of said devices a voltage derived from said discharge of said first discharge means; a motor; and means controlling the operation of said motor in accordance with the phase relation between the voltage drops across said resistive impedances, said last named means including said discharge devices.

7. In a device of the class described, in combination: first and second circuits adapted to be traversed by signal currents alternating at a common variable frequency; said first circuit comprising a resistive impedance and a reactive impedance connected in series; said second circuit comprising a resistive impedance and a normally antiresonant network connected in series; electron discharge means each having control members for regulating the discharge thereof; means impressing the voltage drop across said first resistive impedance, due to said signal current, upon one of said control members; means impressing the voltage drop across said second resistive impedance, due to said signal current, upon another of said control members; further electron discharge devices each having a plurality of control members for jointly regulating the discharge thereof; means impressing upon one of said members of each of said devices a voltage derived from one of said first named discharge means; further means impressing upon another of said members of each of said devices a voltage derived from the discharge of another of said first named discharge means, said further means including means for reversing the phase of one of said impressed voltages with respect to the other; a motor; and means controlling the operation of said motor in accordance with the phase relation between voltages impressed upon said discharge means.

8. In a device of the class described, in combination: first and second circuits adapted to be traversed by signal currents alternating at a common variable frequency; said first circuit comprising a resistive impedance and a reactive impedance connected in series; said second circuit comprising a resistive impedance and a normally antiresonant network connected in series; electron discharge devices each having a plurality of control members for jointly regulating the discharge thereof; means impressing upon one of said members of each of said devices a voltage determined by the voltage drop across said second resistive impedance; a motor; and means controlling the operation of said motor in accordance with the phase relation between the voltage drops across said resistive impedances; said motor control means comprising said discharge devices; said motor control means further including means energizing the anode circuits of said discharge devices at a power frequency, means energizing a first winding of said motor at said power frequency, and means energizing a second winding of said motor in accordance with the discharge of said discharge devices.

9. In a device of the class described, in combination: first and second circuits adapted to be traversed by signal currents alternating at a common variable frequency; said first circuit comprising a resistive impedance and a reactive impedance connected in series; said second circuit comprising a resistive impedance and a normally antiresonant network connected in series; electron discharge devices each having a plurality of control members for jointly regulating the discharge thereof; means impressing upon one of said members of each of said devices a voltage determined by the voltage drop across said second resistive impedance; means impressing upon a second of said members of each of said devices a voltage determined by the voltage drop across said first resistive impedance; said last named means including means for reversing the phase of one of said impressed voltages with respect to the other; a motor; means controlling the operation of said motor in accordance with the phase relation between voltages impressed upon said control members, said motor control means including means energizing the anode circuits of said discharge devices at a power frequency, means energizing a first winding of said motor at said power frequency, and means energizing a second winding of said motor in accordance with the discharge of said discharge devices.

10. Means for measuring the frequency of an alternating signal voltage comprising, in combination: means for deriving from said voltage a second voltage in quadrature therewith; means deriving from said second voltage a pair of voltages mutually displaced in phase by 180°, one of the voltages of said pair being in phase with said second voltage; means, including a normally antiresonant network, for deriving from the voltage to be measured a further voltage whose phase angle with said signal voltage is substantially 0°, plus 90°, and minus 90°, respectively, when the frequency to be measured is equal to, less than, and greater than the natural frequency of said antiresonant network; a reversible motor; motor control means reversibly energizing said motor; means impressing said further voltage and said pair of voltages on said motor control means to operate said motor in a first direction when said further voltage lags the voltage of said source and in the opposite direction when said further voltage leads the voltage of said source; means varying a component of said antiresonant network whereby to vary its natural frequency; and means connecting said motor with said last mentioned means for actuation thereof.

11. Means for measuring the frequency of an alternating signal voltage comprising, in combination: means for deriving from said signal voltage a second voltage in quadrature therewith; means deriving from said second voltage a pair of voltages mutually displaced in phase by 180°, one of the voltages of said pair being in phase with said second voltage; means, including a normally antiresonant network, for deriving from said signal voltage a third voltage whose phase angle, with said signal voltage is substantially 0°, plus 90° and minus 90°, respectively, the frequency of said signal voltage is equal to, less than, and greater than the natural frequency of said antiresonant network; a reversible motor; motor control means energizing said motor; and means impressing said further voltage and said pair of voltages on said motor control means to operate said motor in a first direction when said third voltage lags the voltage of said source and in the opposite direction when said third voltage leads the voltage of said source.

12. An instrument for measuring the frequency of a signal voltage comprising, in combination: first and second electric circuits; means for applying said signal voltage to said circuits to energize them with signal current alternating at a common frequency; said first circuit comprising a resistive impedance connected in series with a reactive impedance; said second circuit comprising a resistive impedance connected in series with an adjustable normally antoresonant network, so that the voltage drops across the resistive impedances may be substantially in the same phase, in phase quadrature, and in phase opposition, according as said frequency varies; a frequency indicator; and means, including multigrid electron discharge means, for changing the indication of said indicator upon change in the phase relation between said voltage drops.

13. An instrument for measuring the frequency of a signal voltage comprising, in combination; first and second electric circuits; means for supplying said signal voltage to said circuits to energize them with signal currents alternating at a common frequency; said first circuit comprising a resistive impedance connected in series with a reactive impedance and said second circuit comprising a resistive impedance connected in series with an adjustable normally antiresonant network, so that the voltage drop across said resistive impedances may be substantially in the same phase, in phase quadrature, and in phase opposition, according as said frequency varies; a frequency indicator; means including a pair of multi-grid electron discharge devices controlling the actuation of said indicator in opposite directions; and means applying said voltage drops between the first and second grids respectively and the cathode of said electron discharge devices to control the discharge thereof in accordance with the phase relation between said voltage drops.

WILLIS H. GILLE.

REFERENCES CITED

The following references are of record in the file of this patent:

UNITED STATES PATENTS

| Number | Name | Date |
|---|---|---|
| 649,006 | Steinmetz | May 8, 1900 |
| 1,579,320 | Hysko | Apr. 6, 1926 |
| 1,787,997 | Schuchmann | Jan. 6, 1931 |
| 1,856,707 | Horton | May 3, 1932 |
| 1,907,965 | Hansell | May 9, 1933 |
| 1,917,395 | Runge | July 11, 1933 |
| 1,981,040 | Gulliksen | Nov. 20, 1934 |
| 2,063,588 | Crosby | Dec. 8, 1936 |
| 2,151,127 | Logan et al. | Mar. 21, 1939 |
| 2,243,702 | Hansell | May 27, 1941 |
| 2,260,122 | Moore | Oct. 21, 1941 |
| 2,271,991 | Rich | Feb. 3, 1942 |